March 4, 1958     D. GOLD     2,825,515
PARACHUTE RISER SYSTEM
Filed Jan. 12, 1956
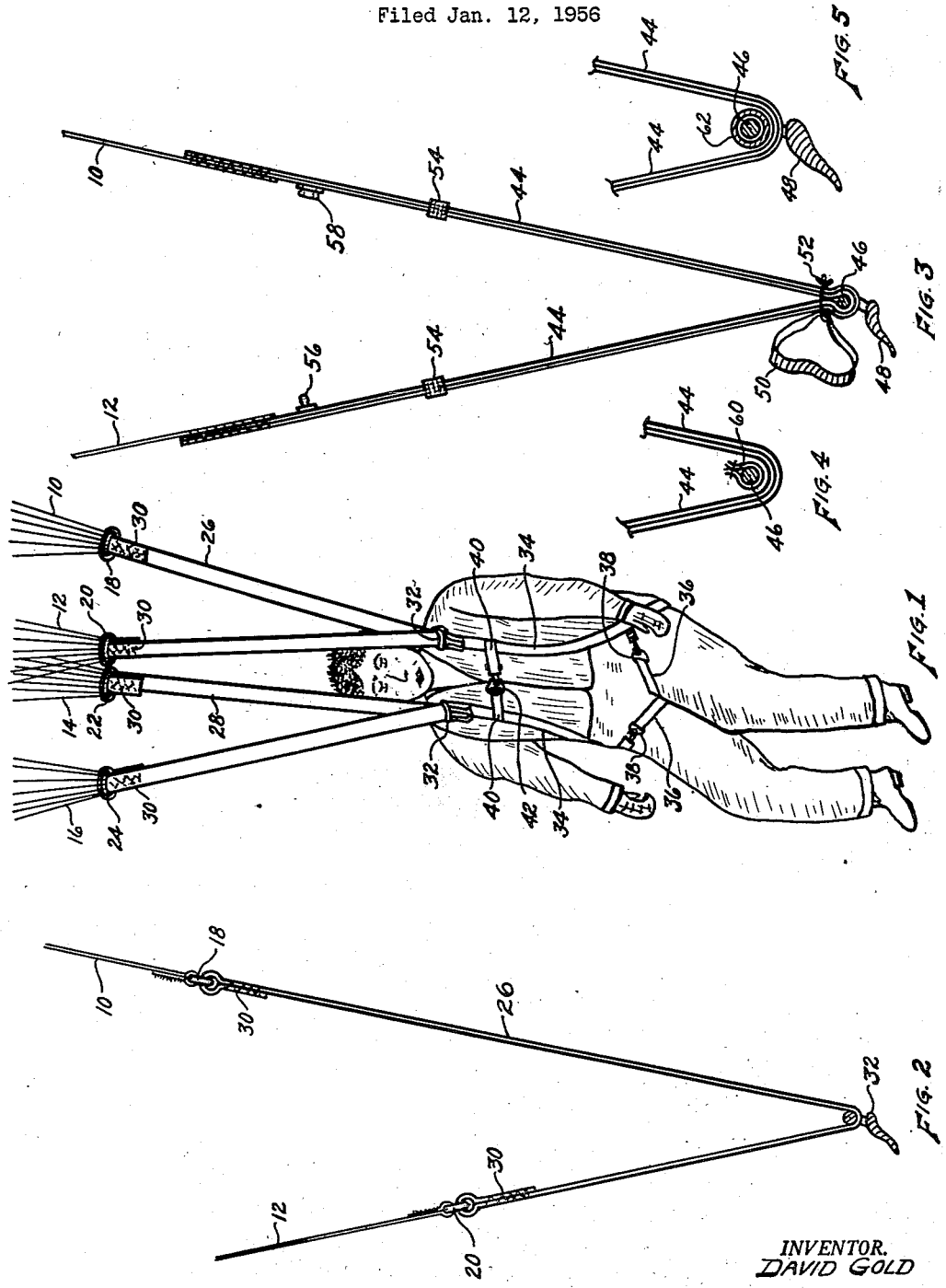
INVENTOR.
DAVID GOLD
BY
ATTORNEYS

United States Patent Office 2,825,515
Patented Mar. 4, 1958

2,825,515

PARACHUTE RISER SYSTEM

David Gold, El Centro, Calif.

Application January 12, 1956, Serial No. 558,815

5 Claims. (Cl. 244—152)

(Granted under Title 35, U. S. Code (1952), sec. 266)

The invention described herein may be manufactured and used by or for the United States Government for governmental purposes without payment to me of any royalty thereon.

The present invention relates generally to improvements in parachutes and, as illustrated herein, relates more particularly to an improved parachute riser system.

Control of a descending parachute by a parachutist is accomplished by manipulation of the parachute risers. Such manipulation causes the shape of parachute canopy to be deformed to such an extent as to change the air flow pattern out of the canopy. It is evident that any change or irregularity in the air flow pattern results in deviation of the path and behavior of the descending parachute.

The modern and commonly used parachute is of the circular type which when open assumes a generally inverted cup-like shape. The cup-like shape of such parachutes may vary from either a deep conical to a relatively flat shape depending upon the type of parachute. Directional control of parachutes of this type is limited to the amount that they can be slipped by pulling on the risers on the side toward which the parachute desires to go. This slipping operation is not easily affected with orthodox equipment because the parachutist must actually support himself during the slipping operation by pulling on the risers. This operation or working of the risers to obtain the desired slip is comparable to chinning oneself. It is evident that the parachutist would become exhausted if it were necessary to do a great amount of slipping. Satisfactory and accurate manipulation, therefore, is difficult to obtain with present available constructions.

It is also extremely important and desirable that a parachute jumper be able to face in any predetermined direction. This is especially true of paratroopers, rescue medic jumpers, forest fire control jumpers and other allied operational paratroopers. The widely used circular types of parachutes are practically impossible to turn regardless of what manipulations are made with the present riser system. Some experienced jumpers can turn their parachute in a chosen direction by slipping violently and attempting to whip the canopy around into that direction. This maneuver, however, is not always successful and is attended with various degrees of danger. In lieu of turning the parachute the jumpers are also trained to make "body turns" and by twisting the riser thus turn themselves under the canopy until they face in the desired direction. This, however, is not entirely satisfactory.

One object of the present invention is to provide an improved riser system for parachutes by the use of which satisfactory and accurate control or manipulation of the descending parachute is obtained. To this end and in accordance with one feature of the invention, the riser system is so arranged that the relative length of the front and rear runs of a riser may be varied by the parachutist while still supporting the entire weight of the parachutist by his harness. As illustrated, the invention contemplates the use of a continuous riser strap having front and rear runs of substantially equal length but which may be varied relatively to each other by sliding the riser strap in a loop attached to the parachute harness which will result in shortening one run and lengthening the other, depending upon which run of the riser is manipulated or pulled by the parachutist.

Another object of the invention is to provide means for use with riser straps of the type just above described where the front and rear runs of the riser strap are maintained in a position wherein they are of substantially the same length by means which may be readily detached at the will of the parachutist to permit manipulation of the riser strap for slipping, as above described. To this end, the mid portion of the riser strap may be secured with a thread, string or other suitable cord so that the harness loop is confined in substantially this area. When desired to release the loop to permit slipping, it is necessary merely to break the thread or string. Another modification which provides readily detachable means is the snap fastener having one element attached to the front run and another element attached to the rear run at substantially the upper end portions thereon so that said fasteners do not interfere with the free sliding of the harness loop during the slipping operation.

Other objects of the invention are to improve generally upon the construction and operation of parachutes.

With the above and other objects and features in view, the invention will now be described with particular reference to the accompanying drawing which illustrates a preferred embodiment of the invention and in which:

Fig. 1 with a view illustrating the use of continuous riser straps in accordance with the present invention;

Fig. 2 is a view in side elevation of one form of riser strap embodying the present invention;

Fig. 3 is a view in side elevation of another embodiment of a riser strap; and

Figs. 4 and 5 are views partly in section illustrating various devices for obtaining differences in feel or friction between the harness loop and riser strap.

Referring now more particularly to the drawings, it will be noted that the parachute of the present invention is provided with a plurality of parachute suspension lines 10, 12, 14 and 16, which are attached to connector links 18, 20, 22 and 24, respectively. The connector links 18 and 20 are secured to the ends of riser straps 26 and 28 which are looped through the respective links 18 and 20 and are suitably secured in position by stitching 30. The riser straps 26 and 28 are passed through metal loops 32 which are secured to parts which form the parachute harness. The harness illustrated in Fig. 1 is a standard design and comprises main body and sling straps 34 encircling leg straps 36 and V-rings 38 which connect the leg straps 36 to the main straps 34. The upper portions of the main body straps 34 are connected by chest straps 40 which are connected together by a snap and V-ring 42.

The riser system disclosed herein can be readily adapted for use in any type and form of parachute harness and it is evident therefore that the present invention is not limited in its use or scope to the particular type of parachute harness disclosed herein.

The riser straps 26 and 28, as illustrated herein, are substantially identical and hence it will be necessary to describe only one of these straps in detail.

Referring now to Fig. 2 of the drawings, the riser strap 26, as previously stated, is looped through the connecting links 18 which are secured to the front and rear shroud lines 10 and 12. The ends of the strap 26 are illustrated as being stitched to provide link-receiving loops but it is evident that other fastening devices may be used if so desired. Preferably the strap 26 is formed of heavy textile webbing but it is clear that any other material of suitable strength may be used if so desired but it is preferable to use a material for this purpose which slides relatively easily over the metal bar of the connector loop 32. This is important since it is desirable to reduce friction between the strap and the connector bar to a minimum so that a minimum of physical effort will be needed to pull the riser strap 26 to cause slipping of the parachute.

Fig. 2 illustrates clearly that a pull on the front line of the riser will shorten the front run and lengthen the rear run thereof. A little effort is expended by the parachutist in pulling on either the front or rear runs because the tension on the shroud lines on the low side decreases as the length of the run decreases. This is a result of the fact that the effective area of the parachute is substantially less when the parachute is collapsed, either partially or substantially completely, on the side where the riser strap 26 is pulled down by the parachutist. Thus the lengthening run of the riser strap 26 aids in overcoming the tension on the short run of the strap 26. The amount of friction of the riser strap against the shoulder fitting or loop 32 is negligible and does not add materially to the effort necessary to be expended by the parachutist. As a matter of fact, a small degree of friction is desirable to impart some "feel" to the riser straps 26, 28 as they are being manipulated. As will later be described, either the shoulder fitting 32 or the strap material may be altered to increase or decrease the amount of friction between the two in accordance with the personal preferences of the user.

The riser straps 26 and 28 disclosed and described above enable the parachutist to make necessary adjustments and to cause the parachute to glide, and to increase the rate of descent. It also permits ready and convenient manipulation of the parachute to stop oscillation. The various manipulations which are necessary to produce these various results are old and well-known. It is also possible to make definite turns, change direction or to increase the speed of the drop. In any of the above cases when making a turn one riser manipulation shortens one riser length and automatically lengthens the other portion of the riser length. This warps one portion of the canopy so that one-quarter of the skirt is at a low level. The adjacent one-half of the skirt is at an intermediate level and the remaining one-quarter of the skirt is at the highest level. The air flow out of the high portion of the skirt plus the impeded air flow and drag of the lower portion of the skirt induces forces which makes the parachute turn in a definite manner and in a chosen direction. It is again pointed out that this riser manipulation requires little physical effort because of the action of the opposing side of the riser straps to balance each other. It is evident that not only is the amount of effort necessary to produce these results reduced but also that the length of pull necessary to produce the desired amount of slide or glide is also reduced. For example, it is readily seen that if a certain type and size of parachute is equipped with regular risers and requires a pull of 24 inches on the risers to get a forward glide, the same forward glide is obtained with a 12-inch pull on the risers 26, 28. As the slidable risers 26 and 28 are pulled and shortened 12 inches in the front, they lengthen 12 inches in the back thus providing a 24-inch differential in the front and rear canopy skirt portions.

The construction shown in Fig. 3 illustrates additional features which can be applied to the basic slidable risers shown in Figs. 1 and 2. A riser 44, which is preferably formed of two plies of textile webbing and which is generally similar to the risers 26 and 28 shown in Fig. 1, is secured to the shroud lines by stitching instead of through connector links as is the case in the construction shown in Figs. 1 and 2. In order to maintain the riser strap 26 centered during the opening of the parachute, a loop 50 is tacked to the strap 44 by hand stitching 52 which passes entirely through the two runs of strap 44. When it is desired to manipulate the parachute by slipping, the stitches 52 are broken by jerking the loop 50 after which the parachute is free to pull on the risers to permit shortening of one of the runs thereof for manipulation of the parachute.

Another convenient device for maintaining the user strap 44 centered during opening of the parachute resides in the use of metallic snap fasteners, comprising male and female elements 58 and 56 secured to the front and rear runs of the riser 44, respectively. During deployment and initial filling of the parachute canopy, the snap elements 58, 56 hold the riser strap 44 centered.

When the parachute is filled, the snap fastener 58, 56 is released and the riser strap 44 is ready for use. If the snap elements 58, 56 are of proper size, they may form effective stops for limiting the movement of the riser 44 relatively to the connector 48.

Under some conditions, it may be desirable to use other means to limit the movement of the riser 44 relatively to the connector 48. To this end stops 54 may be provided. Such stops 54 may conveniently be formed by wrapping suitable webbing about the riser strap 44 at the points shown in Fig. 4 and securing said webbing at said points by suitable stitching.

Figs. 4 and 5 show means for increasing and decreasing the friction between the riser strap 44 and the bar 46 of a connecting loop such as the loop 48. The bar 46 may be covered with a layer of fabric 60 and secured in position by suitable stitching. This provides increased friction between the riser strap 44 and the bar 46 of the connecting loop 48. The construction shown in Fig. 5 comprises roller 62 placed over the bar 46 in such manner that it rotates on the bar 46 when the riser 44 is being manipulated. The devices described just above permit either greater control or greater ease of manipulation or both and their use may be preferred by some parachutists and not by others.

The various expedients disclosed herein may be used in any desired combination and the various devices, or any one of them, shown in the drawings could be incorporated in the construction shown in Figs. 1 and 2. It is to be understood that although textile webbing has been mentioned as a suitable material for use as riser straps, it is evident that other suitable flexible material could also be used if so desired.

Although the invention is disclosed herein as being used in connection with a conventional design of canopy, it is evident, however, that the riser system disclosed herein can be utilized with other types of canopies, such, for example, as the triangle Derry-Slot and Hart-Design types of steerable canopies.

Having thus described my invention what I claim is new and desire to secure by Letters Patent of the United States is:

1. A parachute provided with front and rear canopy sections and having front and rear suspension lines extending downwardly from said canopy sections, a harness, supporting loops fixed to said harness, a plurality of risers having front and rear runs connected to said front and rear suspension lines and passing through said supporting loops, said risers each being formed of a continuous length of material, whereby said risers may slide through said loops when a pull is exerted on either of the runs of said risers, and means for releasably connecting together the front and rear runs of each riser strap to maintain said supporting loops centered in said riser straps during deployment and filling of said parachute canopy.

2. A parachute provided with front and rear canopy sections and having front and rear suspension lines extending downwardly from said canopy sections, a harness, supporting loops fixed to said harness, and a plurality of risers having front and rear runs connected to said front and rear suspension lines and passing through said supporting loops, said risers each being formed of a continuous length of material, whereby said risers may slide through said loops when a pull is exerted on either of the runs of said risers, and stitching passing through the front and rear runs of each of said riser straps to maintain said supporting loop centered in said strap during deployment and filling of said parachute.

3. A parachute provided with front and rear canopy sections and having front and rear suspension lines extending downwardly from said canopy sections, a harness, supporting loops fixed to said harness, a plurality of risers having front and rear runs connected to said front and rear suspension lines and passing through said supporting loops, said risers each being formed of a continuous length of material, whereby said risers may slide through said loops when a pull is exerted on either of the runs of said risers, stitching passing through the front and rear runs of each of said riser straps to maintain said supporting loop centered in said strap during deployment and filling of said parachute, and means under the control of the parachutist for breaking said stitching prior to manipulation of said riser.

4. A parachute provided with front and rear canopy sections and having front and rear suspension lines extending downwardly from said canopy sections, a harness, supporting loops fixed to said harness, a plurality of risers having front and rear runs connected to said front and rear suspension lines and passing through said supporting loops, said risers each being formed of a continuous length of material, whereby said risers may slide through said loops when a pull is exerted on either of the runs of said risers, and a releasable fastener comprising interlocking members fixed to front and rear runs of each of said riser straps to maintain the supporting loops centered in said riser straps during deployment and filling of the parachute.

5. A parachute provided with front and rear canopy sections and having front and rear suspension lines extending downwardly from said canopy sections, a harness, supporting loops fixed to said harness, and a plurality of risers having front and rear runs connected to said front and rear suspension lines and passing through said supporting loops, said risers each being formed of a continuous length of material, whereby said risers may slide through said loops when a pull is exerted on either of the runs of said risers, and means fixed adjacent to the end portions of said riser straps for limiting movement of said straps through said supporting loops when a pull is exerted on either of the runs of said risers.

References Cited in the file of this patent

UNITED STATES PATENTS

| | | |
|---|---|---|
| 2,458,264 | Hart | Jan. 4, 1949 |

FOREIGN PATENTS

| | | |
|---|---|---|
| 226,851 | Great Britain | Dec. 30, 1924 |
| 827,782 | France | Jan. 28, 1938 |